United States Patent [19]

Szorc

[11] 3,851,269

[45] Nov. 26, 1974

[54] HUM REDUCTION IN TRANSISTOR AMPLIFIERS

[75] Inventor: Jan Szorc, Watertown, Mass.

[73] Assignee: KHL Research and Development Corp., Cambridge, Mass.

[22] Filed: Mar. 1, 1972

[21] Appl. No.: 230,674

[52] U.S. Cl. .......................... 330/13, 330/17, 330/149

[51] Int. Cl. .......................... H03f 3/18

[58] Field of Search .......................... 330/13, 17, 149

[56] References Cited

UNITED STATES PATENTS

| | | | |
|---|---|---|---|
| 1,943,986 | 1/1934 | Nyman | 330/149 X |
| 1,954,779 | 4/1934 | Kelly | 330/149 X |
| 2,792,458 | 5/1957 | Good | 179/171 |
| 3,389,344 | 6/1968 | Fichtner | 330/149 X |
| 3,675,142 | 7/1972 | Fichtner | 330/17 |

OTHER PUBLICATIONS

Electronic Design 3, Feb. 1, 1967, p. 41.

*Primary Examiner*—Herman Karl Saalbach
*Assistant Examiner*—James B. Mullins
*Attorney, Agent, or Firm*—Cooper, Dunham, Clark, Griffin & Moran

[57] ABSTRACT

The low signal hum level in the output of a transistor amplifier is substantially reduced by removing the undesirable ripple voltage normally superimposed on the power supply voltage. A portion of the power supply ripple voltage is capacitively coupled to the emitter electrode of the input transistor stage which provides an out of phase ripple voltage to substantially cancel the ripple voltage appearing at the output terminals.

4 Claims, 2 Drawing Figures

HUM REDUCTION IN TRANSISTOR AMPLIFIERS

BACKGROUND OF THE INVENTION

This invention relates to noise supression circuits and, more particularly to a circuit for substantially reducing the hum in a transistor amplifier caused by a ripple voltage superimposed on the DC power supply voltage.

Most types of electronic home entertainment equipment are designed to operate from a power source which is AC in nature. The AC power is rectified to provide a DC power supply voltage to operate the equipment. It is desirable that the AC ripple in the DC voltage supply be minimized for optimum performance. In particular, the audio amplifier section of such entertainment equipment should be virtually free from ripple since the ripple causes objectional hum which is annoying to the listener. Many circuits have been designed to reduce the magnitude of this hum, as for example, by increasing the filtering of the DC voltage. This becomes expensive and requires additional volume in the equipment. A balanced bridge type of circuit or collector to base feedback circuit have also been used, but they required that each stage of amplification be independently compensated, which increases the number of components in each stage.

SUMMARY OF THE INVENTION

The preferred embodiment of the present invention capacitively couples a portion of the ripple voltage, appearing on the DC power supply voltage to the emitter electrode of the input transistor stage to substantially cancel out any ripple voltage appearing at the output terminal. The preferred signal translating system, which has incorporated therewith a negative feedback circuit, is modified to include means for coupling a portion of the ripple voltage to the input stage in the proper phase to substantially cancel the ripple or hum generating voltage, which would reach the speaker of a conventional amplifier.

A signal translating amplifier, according to the principles of the present invention, comprises a transistor input stage of amplification, the transistor having emitter base and collector electrodes, the base electrode being adapted to be coupled to a signal source, a power supply having first and second terminals and providing between the terminals a DC voltage having a ripple voltage superimposed thereon, a transistor output stage including at least a pair of transistors having emitter, base and collector electrodes, the emitter and collector electrodes being serially connected between the first and second terminals of the power supply, the base electrodes being DC coupled to the input stage collector electrode, the commonly coupled electrodes being DC coupled to the input stage emitter electrode and adapted to be coupled to an output terminal, DC bias means coupled from the power supply terminals to the base electrodes of the input transistor stage and the output stage for biasing the stages to their respective operating points. Further included, are voltage divider means having a tap thereon, connected between the first and second terminals of the power supply for obtaining a portion of the ripple voltage and a capacitor connected between the voltage divider tap and the emitter electrode of the input transistor to produce a ripple compensating voltage in the output stage to substantially cancel the ripple appearing at the output terminal.

DESCRIPTION OF THE PREFERRED EMBODIMENT

Figure 1:
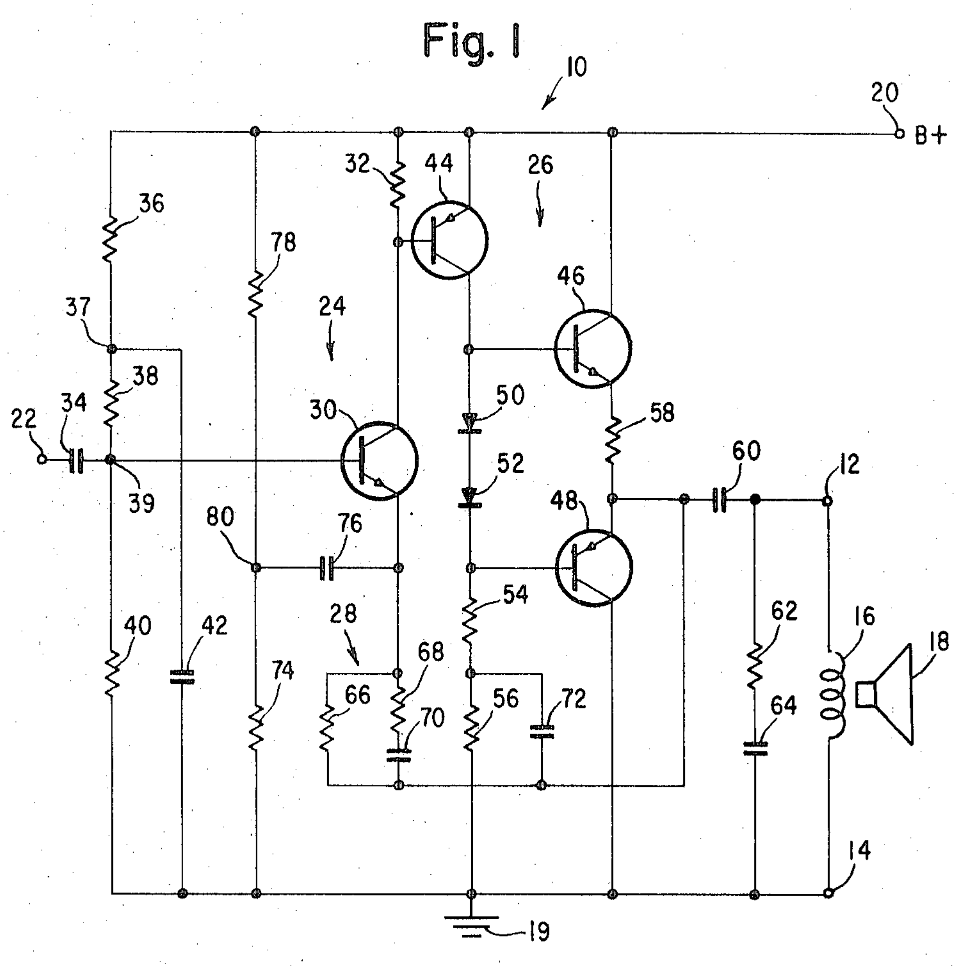
FIG. 1 is a schematic circuit diagram of a preferred embodiment which utilizes the principles of the present invention.

A signal translating system 10, shown in FIG. 1, is adapted for use as an audio amplifier and has its output terminals 12 and 14 connected to the coil 16 of a conventional permanent magnet speaker 18. Terminal 14 is connected to the system's ground reference 19. The DC voltage (B+) for operation of the signal translating system 10 is obtained from the line voltage source in a conventional manner, not shown, and is connected to terminal 20. In the preferred embodiment of the invention the B+ voltage is 24 volts DC. The audio signal voltage from a pre-amplifier, not shown, is connected to input terminal 22.

The translating system 10, sometimes referred to as an audio amplifier, includes an input transistor amplifier stage 24, push-pull output transistor amplifier stage 26, and negative feedback circuitry 28, in addition to stabilization, bootstrap and roll-off circuitry, which will be described in detail hereinafter.

The input transistor amplifier stage 24 includes a transistor 30, of the NPN type, which has its collector electrode coupled to the B+ terminal 20, via collector load resistor 32. The base electrode of transistor 30 is coupled to input terminal 22, via capacitor 34.

Connected in series between the B+ terminal 20 and the ground reference terminal 14 are resistors 36, 38 and 40. A capacitor 42 is connected from the common connection 37 of resistors 36 and 38 to ground 19. The combination of resistor 36 and capacitor 42 function as a R-C filter wherein capacitor 42 bypasses the ripple voltage appearing superimposed on the DC voltage at point 37. The common connection 39 of resistors 38 and 40 is connected to the base electrode of transistor 30 and functions to provide the DC operating point bias for transistor 30.

The output transistor stage 26, in the preferred embodiment of the invention, includes driver transistor 44, of the PNP type, and output transistors 46 and 48; transistor 46 being of the NPN type with transistor 48 being of the PNP type.

The base electrode of transistor 44 is coupled to the collector electrode of transistor 30 and the emitter electrode of transistor 44 is connected to the B+ terminal 20.

The collector electrode of transistor 44 is coupled, via serially connected diodes 50 and 52; and resistors 54 and 56, to ground 19. The anode electrode of diode 50 is connected to the base of electrode of transistor 46 while the cathode electrode of diode 52 is connected to the base electrode of transistor 48. In the preferred embodiment of the invention, one diode is manufactured from a germanium material and the other is manufactured from a silicon material, so that, with a current flow of approximately 25ma provided by transistor 44, the voltage drop across the diodes 50 and 52 biases the base-emitter electrodes of transistors 46 and 48 slightly on with zero signal voltage, provides temperature tracking of the operating point of transistors 46 and 48, and minimizes the cross-over distortion.

The transistors 46 and 48 are coupled in series across the B+ supply voltage (between terminals 20 and 14). The collector electrode of transistor 46 is connected to the B+ terminal 20 while the emitter electrode of transistor 46 is coupled, via an emitter resistor 58, which prevents thermal runaway, to the emitter electrode of transistor 48. The collector electrode of transistor 48 is connected to the ground terminal 14. The emitter electrode of transistor 48 is also coupled, via a capacitor 60 to output terminal 12.

Between terminals 12 and 14, in parallel with the speaker coil 16, is serially connected a resistor 62 and a capacitor 64, which function to prevent high frequency oscillations of the amplifier.

The emitter electrode of transistor 48, in the preferred embodiment of the invention, is DC coupled to the emitter electrode of transistor 30, via a resistor 66 providing negative feedback, which is given a contour or roll off to match the speaker 18 response by a resistor 68 and a capacitor 70 serially connected across resistor 66.

Connected from the emitter electrode of transistor 48 to the common connection of resistors 54 and 56 is a capacitor 72, which is commonly referred to as a bootstrap capacitor, which enables transistor 48 to rapidly follow sudden negative changes in the input signal voltage.

A resistor 74 and a capacitor 76, are coupled from the emitter electrode of transistor 30 to ground 19. The addition of a resistor 78 from B+ terminal 20 to the common connection 80 of resistor 74 and capacitor 76 introduces another voltage at the emitter electrode of transistor 30. The resistor 78 and the resistor 74 being serially connected between terminals 20 and 14 are across the power supply (B+), function as a voltage divider and provide a voltage at their common connection 80, which is a portion of the B+ voltage. The AC voltage appearing at the common connection 80 is a portion of the AC ripple voltage superimposed on the DC voltage when the power supply rectifies and filters the AC line voltage used for operation of the amplifier and is coupled, via capacitor 76, to the emitter electrode of transistor 30. Resistor 78 is chosen to provide the proper amount of ripple voltage at terminal 12 to substantially cancel any ripple voltage appearing there because of being injected into the amplifier stages by the driver transistor 44 or output transistor 46. Since it is desirable to make the effect of the undesirable signal voltage (ripple) appearing at the output as low as possible and since the ripple signal voltage introduced via transistor 44 or 46 and appearing at the output is in phase with the power supply ripple voltage, the present invention couples a portion of the power supply ripple voltage to the emitter electrode of transistor 30, which provides a voltage at its collector electrode that cancels out the undesirable ripple voltage appearing at the collector electrode of transistor 44 or emitter electrode of transistor 46 and thus at output terminal 12.

Figure 2:
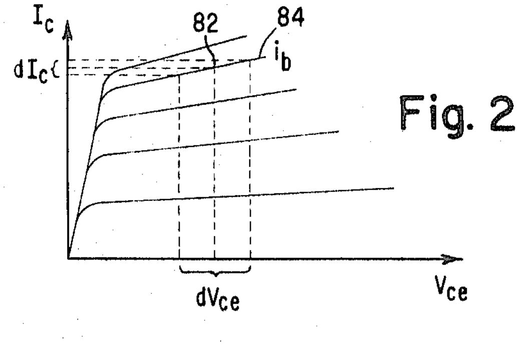
FIG. 2 is a graphical representation of typical transistor characteristic curves showing the collector electrode current verses the collector electrode voltage at various base electrode currents.

The introduction of the unwanted ripple into the amplifier is more clearly understood with reference to FIG. 2 which is a graphical representation of the collector electrode current ($I_c$) verses collector electrode voltage ($V_{ce}$) of a typical transistor at different base electrode ($I_b$) currents. The operating point 82 of transistor 44 is designed to operate at a particular base current ($I_b$) value 84, as shown in FIG. 2, for optimum performance. Variations in the B+ voltage, which are caused by the ripple voltage being superimposed on the B+ voltage causes a change in the voltage across the collector-emitter electrodes of transistor 44, which is shown as $dV_{ce}$ in FIG. 2. This causes a corresponding change in the collector electrode current ($dI_c$), which is coupled via transistor 46, 48 and capacitor 60 to output terminal 12.

In operation, the translating amplifier system 10 amplifies a signal voltage coupled to terminal 22 by providing the amplification in the common emitter connected transistor 30, which also provides a 180° phase shift, and similarly connected transistor 44, which also provides gain and a 180° phase shift to the signal. The signal is then coupled, via emitter follower transistor 46 and 48, to the output terminal 12. Unwanted ripple voltage causing variations in collector electrode current because of a changing collector-emitter voltage drop across transistor 44, as shown in FIG. 2, will be in phase with the power supply ripple voltage when appearing at terminal 12, since there is virtually no phase shift through transistors 46 and 48. Introducing a portion of the ripple voltage of sufficient magnitude to cancel out the changing collector electrode current of transistor 44 caused by the changing collector-emitter voltage ($V_{ce}$) of transistor 44 is accomplished by providing a voltage at the base electrode of transistor 44 which provides a current which occurs in opposition (180° out of phase) with the changing $V_{ce}$ voltage of transistor 44. The proper amount of ripple voltage is coupled to the emitter electrode of transistor 30 and it provides a current at the collector electrode of transistor 30 shifted 180° where it substantially cancels the effect of the changing $V_{ce}$ voltage.

Thus, hereinbefore has been disclosed a simple and inexpensive means for removing unwanted power supply ripple from the output of a push-pull translating amplifier system.

Having thus described the nature of this invention, what I claim is:

1. A signal translating system comprising:

a. a transistor input stage of amplification including a transistor having emitter, base and collector electrodes, said base electrode being adapted to be coupled to a signal voltage source;

b. a power supply having first and second terminals and providing between said terminals a DC voltage having a ripple voltage superimposed thereon;

c. a transistor output stage including at least a pair of transistors having emitter, base and collector electrodes, said emitter and collector electrodes of said output stage being serially connected between the first and second terminals of said power supply, said base electrodes of said output stage being coupled to said input stage collector electrode, said serially connected output stage electrodes being coupled to said input stage emitter electrode and to an output terminal;

d. DC bias means coupled from said power supply terminals to the base electrodes of said input and said output stages for biasing said stages to their respective operating points;

e. voltage divider means having a tap thereon, connected between the first and second terminals of said power supply for obtaining a portion of said ripple voltage, and f. a capacitor connected between said voltage divider tap and the emitter electrode of said input transistor to produce a ripple compensating voltage in said output stage to substantially cancel the ripple appearing at said output terminal; said tap being not coupled to any other electrode of said input transistor.

2. A signal translating system according to claim 1 wherein said voltage divider means comprises a first and second resistor connected in series with their common connection being said voltage divider tap.

3. In a transistorized amplifier of the type having an output terminal, an input amplifying transistor stage having substantial gain and including an input transistor having emitter, base and collector electrodes, and an output stage including at least one transistor, a DC voltage source having a ripple component, said voltage source having first and second terminals, said input and output transistor stages being biased to their operating points by means coupled to said DC voltage source, the improvement comprising circuit means interconnecting the electrodes of said input transistor to provide substantial gain at an output electrode thereof of an input signal applied to an input electrode thereof, and voltage divider and AC coupling means connected between said first and second terminals of said voltage source and to only the remaining one of said input transistor electrodes of said amplifying stage for providing to said one only electrode a portion of only said ripple component for substantially cancelling the ripple voltage appearing at said output terminal.

4. In a transistorized amplifier of the type having an output terminal, an input amplifying transistor stage having substantial gain and including an input transistor having emitter, base and collector electrodes, and an output stage including at least one transistor, a DC voltage source having a ripple component, said voltage source having first and second terminals, said input and output transistor stages being biased to their operating points by means coupled to said DC voltage source, the improvement comprising voltage divider and AC coupling means connected between said first and second terminals of said voltage source and to only one of said input transistor electrodes of said amplifying stage for providing to said one only electrode a portion of only said ripple component for substantially cancelling the ripple voltage appearing at said output terminal, wherein said voltage divider and AC coupling means comprises resistor means connected between said first and second terminals of said voltage source, and capacitor means connecting an intermediate point of said resistor means to said one only electrode.

* * * * *